United States Patent
Hirano

(10) Patent No.: US 9,025,277 B1
(45) Date of Patent: May 5, 2015

(54) HARD DISK DRIVE HAVING MULTIPLE DISK STACKS ON A ROTATABLE PLATFORM

(71) Applicant: HGST Netherlands B.V., Amsterdam (NL)

(72) Inventor: Toshiki Hirano, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/051,281

(22) Filed: Oct. 10, 2013

(51) Int. Cl.
- *G11B 5/012* (2006.01)
- *G11B 17/08* (2006.01)
- *G11B 5/48* (2006.01)

(52) U.S. Cl.
CPC .................... *G11B 5/4873* (2013.01)

(58) Field of Classification Search
CPC ........................................ G11B 25/043
USPC .......................................... 360/97.11–98.04
See application file for complete search history.

(56) References Cited

U.S. PATENT DOCUMENTS

| | | | |
|---|---|---|---|
| 3,864,747 A | 2/1975 | Pejcha | |
| 4,019,205 A | 4/1977 | Salmond et al. | |
| 4,566,087 A * | 1/1986 | Kraft | 369/30.29 |
| 5,343,345 A | 8/1994 | Gilovich | |
| 5,415,471 A | 5/1995 | Dalziel | |
| 5,449,091 A | 9/1995 | Dalziel | |
| 5,777,957 A | 7/1998 | Lyman | |
| 6,005,831 A | 12/1999 | Park | |
| 6,115,215 A | 9/2000 | Adams et al. | |
| 6,208,489 B1 | 3/2001 | Marchon | |
| 6,449,130 B1 | 9/2002 | Koyama | |
| 6,628,469 B1 | 9/2003 | Hoyt | |
| 7,475,409 B2 | 1/2009 | Yamagami et al. | |
| 7,596,060 B2 | 9/2009 | Li | |
| 7,760,463 B2 | 7/2010 | Ward et al. | |
| 8,028,311 B2 | 9/2011 | Gilovich | |
| 8,112,580 B2 | 2/2012 | Bandic et al. | |
| 2006/0044663 A1 | 3/2006 | Stiles et al. | |
| 2009/0067086 A1* | 3/2009 | Kaneko et al. | 360/98.01 |
| 2011/0122528 A1 | 5/2011 | Burness | |

FOREIGN PATENT DOCUMENTS

EP 0671741 A2 9/1995
EP 0895237 A1 2/1999

OTHER PUBLICATIONS

Andrew, Kane, "Unusual Disk Optimization Techniques", University of Waterloo, Oct. 28, 2009, 33 pp., URL: https://cs.uwaterloo.ca/~arkane/Presentation%20-%20Unusual%20Disk%20Optimization%20Techniques.pdf.

(Continued)

*Primary Examiner* — Joseph Feild
*Assistant Examiner* — Gustavo Polo
(74) *Attorney, Agent, or Firm* — John D. Henkhaus

(57) ABSTRACT

A lower cost per unit of storage hard disk drive (HDD) includes multiple disk stacks fixed to a carousel, and at least one head stack assembly (HSA) for accessing portions of the magnetic-recording disk(s) of each of the multiple disk stacks after the carousel rotates to move a disk stack in a fixed position relative to the HSA.

12 Claims, 2 Drawing Sheets

(56) References Cited

OTHER PUBLICATIONS

Seiichi Sugaya, "Trends in Enterprise Hard Disk Drives", Fujitsu Sci. Tech. J., Jan. 2006, pp. 61-71, vol. 42, Issue 1.

"Toshiba rises above competition with world's lightest notebook PC", downloaded from: https://www.toshiba.eu/innovation/jsp/news.do?service=EU&year=NONE&ID=PORTEGE_R500_NEWS_RELEASE_0 607 on May 28, 2014.

* cited by examiner

HARD DISK DRIVE HAVING MULTIPLE DISK STACKS ON A ROTATABLE PLATFORM

FIELD OF THE INVENTION

Embodiments of the invention relate generally to hard disk drive (HDD) storage devices and more particularly to lowering the cost per unit of storage capacity.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator.

A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

While increasing areal density, a measure of the quantity of information bits that can be stored on a given area of disk surface, is one of the ever-present holy grails of HDD design evolution, the cost per unit of storage is also an ever-present constraint associated with HDD development. The cost per storage capacity, or price per capacity from a consumer's standpoint, is especially important in large data storage scenarios, such as with archival and backup storage in which large amounts of data are stored but infrequently accessed.

SUMMARY OF EMBODIMENTS OF THE INVENTION

Embodiments are directed to a hard disk drive (HDD) having multiple disk stacks fixed to a carousel and one or more head stack assembly (HSA) for accessing portions of one or more magnetic-recording disk of each of the multiple disk stacks. For example, a multiple-disk-stack HDD may be configured with ten disk stacks circularly mounted on the carousel, thereby configured for installation in a standard 19-inch equipment rack. Thus, a lower cost HDD design is described which can be manufactured to have a lower cost per unit of storage.

Embodiments include an HSA having a single actuator configured to access each disk stack asynchronously, after the carousel rotates to move a disk stack in a fixed position relative to the HSA. Embodiments also include multiple head stack assemblies configured to access multiple disk stacks simultaneously.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Described herein are approaches to a hard disk drive (HDD) having multiple disk stack assemblies fixed to a rotatable platform, or carousel, and which are serviced by one or more head stack assembly (HSA) after being rotated to a fixed position relative to an HSA. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 1:
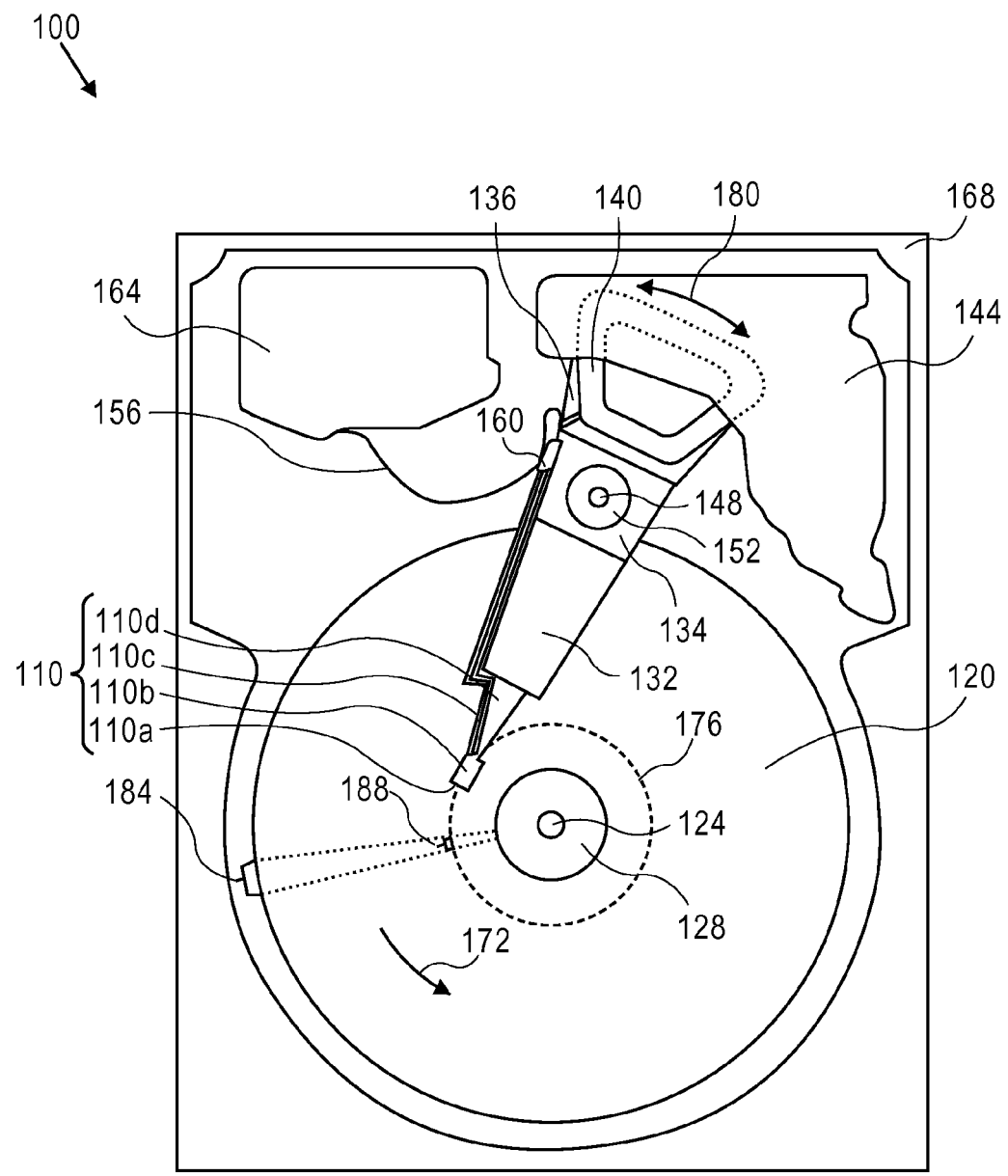
FIG. 1 is a plan view of a conventional hard disk drive (HDD)

Embodiments of the invention relate to a hard-disk drive (HDD). In accordance with an embodiment of the invention, a plan view illustrating a conventional HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider, and a load beam 110d attached to the lead suspension 110c. The HDD 100 also includes at least one magnetic-recording media 120 rotatably mounted on a spindle 124 and a drive motor (not shown) attached to the spindle 124 for rotating the media 120. The head 110a includes a write element and a read element for respectively writing and reading information stored on the media 120 of the HDD 100. The media 120 or a plurality of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not visible). The armature 136 of the VCM is attached to the carriage 134 and is configured to move the arm 132 and the HGA 110 to access portions of the media 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the media 120 (e.g., magnetic-recording disks) for read and write operations.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a casting, depending upon whether the HDD housing is cast, in conjunction with an HDD cover provides a sealed, protective enclosure for the information storage components of the HDD 100.

With further reference to FIG. 1, in accordance with an embodiment of the present invention, other electronic components (not visible), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110b rides so that the slider 110b flies above the surface of the media 120 without making contact with a thin magnetic-recording medium in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks (not shown) arranged in sectors on the media 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Introduction

The cost per unit of storage, or price per storage capacity from a consumer's standpoint, is especially important in large data storage scenarios (also referred to as "Big Data"), such as with archival and backup storage in which large amounts of data are stored but infrequently accessed (also referred to as "cold storage"). Some example approaches to lowering the cost per unit of storage are to use larger diameter disks, more disks per disk stack, and the "elevator drive" with a head stack assembly moving vertically to service a large stack of disks.

Multiple-Disk-Stacks on a Carousel

One approach to lowering the cost per unit of storage is to increase the share of the total cost that the media represents, effectively amortizing cost contributors such as the read/write heads, electronics, and the like, over more media capacity and thus more overall storage capacity.

Figure 2:
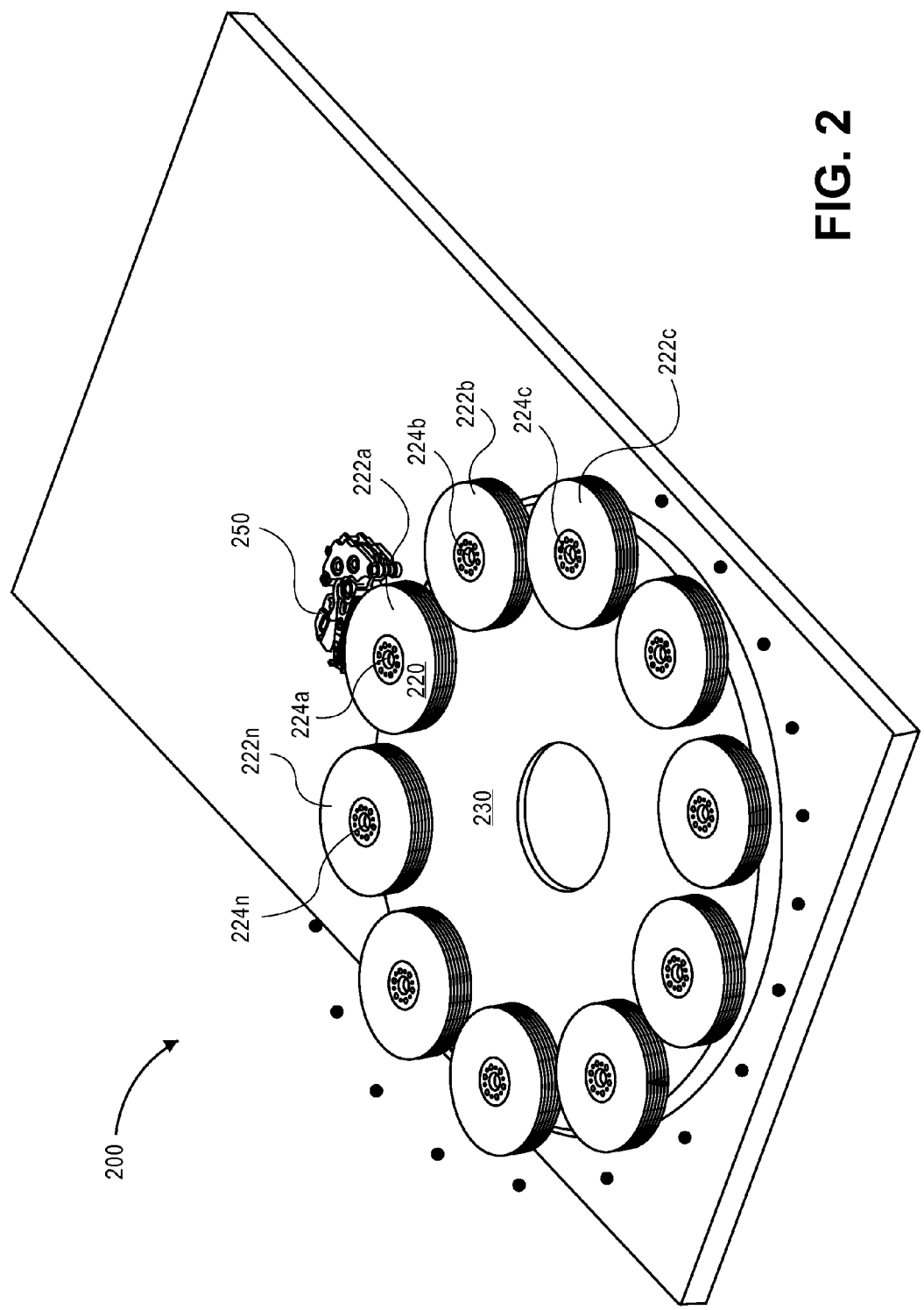
FIG. 2 is a plan view of a multiple disk stack HDD, according to an embodiment of the invention.

FIG. 2 is a simplified plan view of a multiple disk stack HDD, according to an embodiment of the invention. With the exception of components and/or assemblies discussed hereafter, the internal components of HDD 200 are largely similar to or the same as like components of HDD 100 (FIG. 1). Thus, for the purposes of clarity and simplicity, such like components are not necessarily depicted in FIG. 2 or described again in reference to FIG. 2. Reference is made to FIG. 1 and the corresponding description for the showing and description of the components of HDD 200 that are like components of HDD 100.

One difference between HDD 200 and HDD 100 (FIG. 1) is that HDD 200 comprises multiple disk stacks, i.e., disk stacks 222a, 222b, 222c-222n (referred to hereafter collectively as 222a-222n), where n equals a total number of disk stacks which may vary from implementation to implementation, rather than the typical single disk stack. In FIG. 2, for the purpose of clarity, rather than labeling each disk stack the dots depicted around the perimeter of the disk stacks 222a-222n are intended represent a variable set of disk stacks that may be implemented in a multi-disk-stack HDD 200. Each disk stack 222a-222n comprises one or more disk 220. Preferably but not by way of limitation, each disk stack 222a-222n would comprise multiple disks, such as ten disks 220 per disk stack 222a-222n, to provide for a large storage capacity HDD. The one or more disk 220 of each disk stack 222a-222n are coupled to and rotated by respective spindles, i.e., spindle 224a-224n.

According to an embodiment, HDD 200 is configured with ten disk stacks 222a-222n, which is compatible with a standard 19-inch equipment rack and facilitates ease of installation in such a standard sized rack.

Each disk stack 222a-222n is mounted on or fixed to a rotatable platform, also referred to herein as carousel 230. According to an embodiment, carousel 230 is rotatable in both clockwise and counter-clockwise directions. The particular design (e.g., mechanical, electrical, electro-mechanical, etc.) utilized to rotate carousel 230 may vary from implementation to implementation. For non-limiting examples, one could implement a direct rotary actuator, a motor and belt mechanism, a gear mechanism, and the like, where a suitable rotating mechanism may be selected by one skilled in the relevant art based, for example, on the presence of particular design constraints and/or goals. Further, carousel 230 is configured to rotate independently of the rotation of the disk spindles 224a-224n. However, carousel 230 and spindles 224a-224n may be rotated simultaneously, although disks 220 would not be accessible for read/write operations as the carousel 230 is rotating.

HDD 200 further comprises one or more head stack assembly (HSA) 250 to service the disks 220 of disk stacks 222a-222n. Although a single HSA 250 is depicted in FIG. 2 for purposes of simplicity and clarity, HDD 200 may be configured with more than one HSA 250 at one or more respective positions adjacent to and around the perimeter of carousel 230. HSA 250 comprises similar components as shown and described in reference to FIG. 1, such as armature 136, voice coil 140 or another type of rotational actuating device, pivot-shaft 148, pivot-bearing assembly 152, carriage 134, arm 132, head gimbal assembly (HGA) 110, arm-electronics (AE) module 160, and flexible interconnect cable 156.

Each HSA 250 is configured to move a respective one or more head slider to access portions of a magnetic-recording disk 220 of the disk stacks 222a-222n. In a single-HSA 250 embodiment, each disk stack 222a-222n is accessed asynchronously, i.e., one disk stack 222a-222n at a time, after the respective disk stack is rotated by the carousel 230 to a fixed position relative to the HSA 250. In a multi-HSA 250 embodiment, multiple disk stacks 222a-222n may be accessed simultaneously by a respective HSA 250 after the respective disk stacks are rotated by the carousel 230 to respective fixed positions relative to each respective HSA 250.

A particular system or apparatus design (e.g., mechanical, electrical, electro-mechanical, optical, etc.) utilized for rotating the carousel 230 to precisely position, align and temporarily fix each disk stack 222a-222n relative to HSA 250 may vary from implementation to implementation. For non-limiting examples, one could implement a slot and pin mechanism, a position sensor system, and the like, where a suitable positioning and fixing mechanism may be selected by one skilled in the relevant art based, for example, on the presence of particular design constraints and/or goals.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard disk drive, comprising:
    a plurality of disk stacks, each disk stack comprising one or more magnetic-recording disk rotatably mounted on a spindle;
    a rotatable carousel on which said plurality of disk stacks are fixed; and
    a head stack assembly, comprising:
        a head slider comprising a magnetic read/write head for reading data from and writing data to one or more magnetic-recording disk,
        a flexure, to which said head slider is coupled,
        an actuator arm, to which said flexure is coupled, and
        an actuator, to which said actuator arm is coupled, said actuator configured to move said head slider to access portions of said one or more magnetic-recording disk of each of said plurality of disk stacks.

2. The hard disk drive of claim 1,
    wherein each of the plurality of disk stacks is positioned for asynchronous access.

3. The hard disk drive of claim 1,
    wherein each of the plurality of disk stacks is positioned for asynchronous access after said disk stack is rotated by said carousel to a fixed position relative to said head stack assembly.

4. The hard disk drive of claim 1, consisting of a single head stack assembly.

5. The hard disk drive of claim 1, comprising a plurality of head stack assemblies.

6. The hard disk drive of claim 5,
    wherein each of said plurality of head stack assemblies is configured to move a respective head slider to access said portions of said one or more magnetic-recording disk; and
    wherein a plurality of disk stacks are positioned for simultaneous access by said plurality of head stack assemblies.

7. The hard disk drive of claim 1,
    wherein said plurality of disk stacks consists of ten disk stacks configured for installation in a standard 19-inch equipment rack.

8. The hard disk drive of claim 1,
    wherein said carousel is rotatable in both clockwise and counter-clockwise directions.

9. A hard disk drive, comprising:
    ten disk stacks, each disk stack comprising one or more magnetic-recording disk rotatably mounted on a spindle;
    a rotatable platform on which said disk stacks are fixed; and
    one or more head stack assembly, each comprising:
        a head slider comprising a magnetic read/write head for reading data from and writing data to one or more magnetic-recording disk,
        a flexure, to which said head slider is coupled,
        an actuator arm, to which said flexure is coupled, and
        an actuator, to which said actuator arm is coupled, said actuator configured to move said head slider to access portions of said one or more magnetic-recording disk of said disk stacks after a disk stack is rotated by said rotatable platform to a fixed position relative to said head stack assembly.

10. The hard disk drive of claim 9, comprising;
    a plurality of head stack assemblies; and
    wherein each of said plurality of head stack assemblies is configured to move a respective head slider to access said portions of said one or more magnetic-recording disk, and wherein a plurality of disk stacks are positioned for simultaneous access by said plurality of head stack assemblies.

11. The hard disk drive of claim 9,
    wherein said disk stacks are configured for installation in a standard 19-inch equipment rack.

12. The hard disk drive of claim 9,
    wherein said rotatable platform is rotatable in both clockwise and counter-clockwise directions.

\* \* \* \* \*